(No Model.)
H. M. RIBBLE & J. W. SAMMIS.
BABY CARRIAGE.
No. 317,578. Patented May 12, 1885.
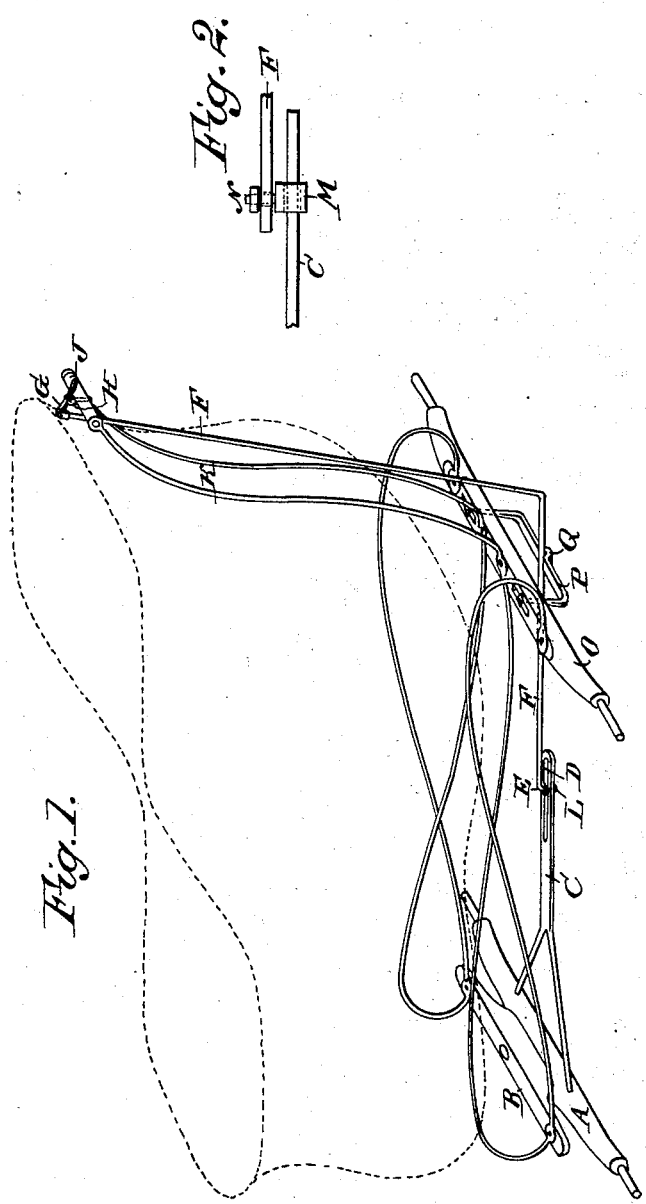
WITNESSES:
INVENTOR:
H. M. Ribble
J. W. Sammis
BY Munn & Co
ATTORNEYS.

UNITED STATES PATENT OFFICE.

HARRY M. RIBBLE AND JOHN W. SAMMIS, OF DOVER, NEW JERSEY.

BABY-CARRIAGE.

SPECIFICATION forming part of Letters Patent No. 317,572, dated May 12, 1885.

Application filed August 27, 1884. (No model.)

*To all whom it may concern:*

Be it known that we, HARRY M. RIBBLE and JOHN W. SAMMIS, both of Dover, in the county of Morris and State of New Jersey, have invented certain new and useful Improvements in Baby-Carriages, of which the following is a full, clear, and exact description.

The object of our invention is to provide certain new and useful improvements in baby-carriages to facilitate turning and steering the carriage.

The invention consists in the combination, with a pivoted front axle, of an arm projecting rearwardly from the same and of a bent rod connected with the arm and extending up to the handle. On the rear axle a U-shaped hanger is secured, which is provided with a notch for receiving the rod, thus locking it in place. By means of the said rod and arm the front axle can be turned more or less and the vehicle steered.

Reference is to be had to the accompanying drawings, forming part of this specification, in which similar letters of reference indicate corresponding parts in both the figures.

Figure 1 is a perspective view of the frame of a baby-carriage provided with our improvement. Fig. 2 is a detail view of a modification of the arm and rod connection.

The front axle, A, is pivoted on the under side of the bolster B, on which the vehicle body, box, or basket rests.

From the axle A an arm, C, extends toward the rear, the said arm being provided with a longitudinal slot, D, through which the hook end E of an L-shaped rod, F, passes, the upper end of the said rod being pivoted to a short lever, G, pivoted in a fork, H, which is swiveled or held to turn on the cross-piece J, uniting the upper ends of the handles K, arranged in the usual manner on the rear part of the vehicle.

A nut, L, is screwed on the hook end E of the rod F, to permit adjusting the end of the rod F a greater or less distance from the front axle.

In place of the above-described device for adjustment, the lower end of the rod F may be provided with a box, M, for receiving the free end of the arm C, the parts being locked in place by means of a screw, N.

On the under side of the rear axle, O, a U-shaped hanger, P, is secured, provided at its middle with a notch, Q, adapted to receive the rod F.

The operation is as follows: Ordinarily, or when the carriage is to be pushed straight ahead, the rod F is in the notch Q, and thereby the front axle is held in place and prevented from turning. If the vehicle is to be steered, for turning a corner or for any other reason, the outer end of the lever J is pressed down, whereby the inner end of the same and the rod F are raised and the said rod disengaged. At the same time the lever J is turned slightly to turn the front axle slightly in the direction desired. The front axle then swings around, thus causing the carriage to turn a corner, &c.

The slot D or the box M are provided to permit the end of the arm C to slide on the end of the rod F.

The front wheels of the carriage need not be lifted from the ground for steering the vehicle. There is no undue strain on the handles, and scraping of the wheels and jarring of the carriage are prevented.

Having thus described our invention, what we claim as new, and desire to secure by Letters Patent, is—

1. In a baby-carriage, the combination, with a pivoted front axle, of an arm projecting toward the rear from the same, and of a rod connected with the said arm and extending up to the handle of the carriage, and of devices for locking the said rod in place in case the carriage is to run straight on, substantially as herein shown and described.

2. In a baby-carriage, the combination, with a pivoted front axle, of an arm projecting from the same, a rod extending from the arm to the handle of the carriage, and of a hanger on the rear axle, which hanger is provided with a notch for receiving the above-mentioned rod, thus locking the same in place, substantially as herein shown and described.

3. In a baby-carriage, the combination, with the pivoted front axle, A, of the arm C, and the angular rod F, connected with the free end of the arm, extending up to the handle of the carriage, and pivoted to a short lever pivoted on the handle to turn and to swing vertically, substantially as herein shown and described.

4. In a baby-carriage, the combination, with the pivoted front axle, A, of the arm C, projecting from the same, the angular rod F, having one end held on the arm C, to slide on the same, and its other end pivoted to a lever on the handle, and of the hanger P, provided with a notch, Q, substantially as herein shown and described.

HARRY M. RIBBLE.
JOHN W. SAMMIS.

Witnesses:
E. W. HALLER,
CHARLES ZINDLE.